United States Patent
Didier et al.

(12) 
(10) Patent No.: US 6,606,691 B2
(45) Date of Patent: Aug. 12, 2003

(54) SYSTEM INTEGRATING AGENTS HAVING DIFFERENT RESOURCE-ACCESSING SCHEMES

(75) Inventors: Robin Didier, Meudon la Foret (FR); Carolina Miro Sorolla, Villecresnes (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/024,772

(22) Filed: Dec. 20, 2001

(65) Prior Publication Data

US 2002/0152360 A1 Oct. 17, 2002

(30) Foreign Application Priority Data

Dec. 28, 2000 (EP) ............................................. 00403699

(51) Int. Cl.[7] ............................................. G06F 12/00
(52) U.S. Cl. .................. 711/151; 711/147; 711/154; 711/158; 710/117; 710/241; 710/244
(58) Field of Search ................................. 711/105, 147, 711/151, 154, 158, 167; 710/113, 117, 241, 244

(56) References Cited

U.S. PATENT DOCUMENTS 5,768,544 A    6/1998  Hauck ......................... 710/118

6,314,499 B1 * 11/2001  Kermani ...................... 711/147

FOREIGN PATENT DOCUMENTS

EP    0203007 A1    11/1986
WO    9812645 A1    3/1998

* cited by examiner

*Primary Examiner*—Kevin L. Ellis
*Assistant Examiner*—Jasmine Song
(74) *Attorney, Agent, or Firm*—Laurie E. Gathman (57) ABSTRACT

In a system integrating modules (PROC) designed for a time-slotted resource-accessing scheme and modules (PROC') designed for accessing a common resource based on request-arbitration, a request-arbitration scheme is used for managing access to a common resource. The module(s) (PROC) designed for a time-slotted resource-accessing scheme are associated with an anticipatory request generator (ARG) adapted to generate, and forward to the arbiter (P_ARB), anticipated requests produced ahead of the time instants when the associated modules are designed to make access requests. A data buffer (DATA BUF) is also associated with each of the modules designed for a time-slotted resource-accessing scheme, so as to hold data obtained as a result of an anticipated request until the time instant when the module generates the request associated with this data.

10 Claims, 5 Drawing Sheets

SYSTEM INTEGRATING AGENTS HAVING DIFFERENT RESOURCE-ACCESSING SCHEMES

FIELD OF THE INVENTION

The present invention relates to a system that accommodates agents having different schemes for managing access to a common resource. Typically, the present invention may be applied so as to enable a single system to employ data processors having different techniques for managing access to a common memory. A non-limitative example of such a system is an MPEG codec (coder-decoder implementing the standards defined by the Motion Picture Expert Group).

DESCRIPTION OF THE RELATED ART

Various systems exist in which it is necessary for a common resource to be shared between a plurality of agents, only one of the agents at a time being able to access the shared resource. This is the case, for example, in a data processing device in which several processors share a common memory. In the present document, the term "agent" is used both to designate a module and a process implemented by a module (it being understood that a given module may implement a plurality of processes).

Different schemes have been adopted to manage the accessing of the shared resource by the individual agents. Some systems adopt a time-slotted accessing scheme in which each agent accesses the shared resource at a predetermined instant, for a predetermined period of time, and the agents access the shared resource, repeatedly, in a predetermined order. Other systems adopt a scheme in which agents make access-requests as and when they require access and, in the event that a plurality of requests are issued at the same time, an arbiter decides which access-request will be successful. The arbiter implements an arbitration scheme that is designed to ensure that each agent will have access to the shared resource for a period of time sufficient for its needs. This is usually considered in terms of the "bandwidth" required by each agent.

WO98/12645 describes a method and apparatus for bus arbitration in a system where several devices (central processing unit (CPU), data and instruction caches, image co-processor, etc.) integrated on a microprocessor chip use a shared bus to access a common (synchronous DRAM) memory located off the chip. In this system, there is a weighted allocation of bandwidth to the different agents requiring bus access and the arbiter implements an arbitration scheme that ensures that each device receives the bandwidth allocation it requires.

Figure 1:
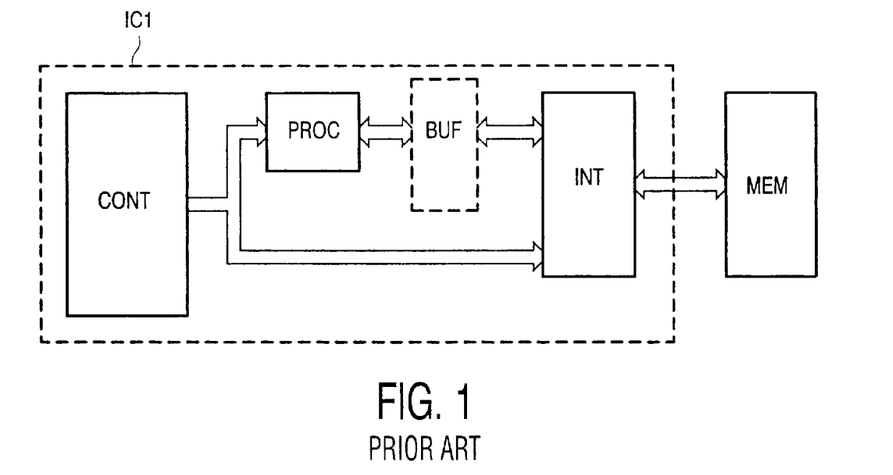
FIG. 1 is a diagram illustrating the basic components of a system in which processing modules share access to a common memory according to a time-slotted memory-access scheme.

FIG. 1 illustrates the typical environment of a module designed to use a time-slotted access scheme; in this example the module is a processor, PROC, and the shared resource is a memory, MEM. The module PROC is adapted to access the memory MEM via an interface, INT. Only one module PROC is shown in FIG. 1 but it is to be understood that, in general, several such modules will be integrated onto a single chip IC1. Moreover, although, as illustrated here, the memory interface is provided on-chip, it is to be understood that the present invention is applicable also in the case of re-use of modules designed to be associated with an off-chip memory-interface. The interface INT grants the module PROC access to the memory MEM on the basis of a memory-access scheme according to which predetermined time slots are reserved for the module PROC to transfer data to the memory MEM and/or receive data therefrom.

The interface INT is configurable, that is, the allocation of modules to specific time slots can be changed. A controller CONT applies control data to the interface INT to specify which time slot(s) are to be used for access to memory MEM on behalf of the respective different modules on the chip. The controller CONT also applies control data to the module PROC so as to inform it of the predetermined time slots at which it should fetch data from or write data to the memory MEM (via a buffer internal to the interface INT). The allocation of processing modules to time slots is changed relatively infrequently and, thus, this control data is only sent to the interface and processing modules when a configuration change is required.

In general, each of the processing modules on the chip will repeatedly implement the same processing function, but applied to new data. For example, in the case where the IC1 of FIG. 1 is the core of an MPEG encoder, certain pre-set functions are repeatedly performed on successive macro-blocks making up a frame of an image signal, by a group of processing modules. The controller, CONT, internal to IC1 outputs to the processing modules and the interface synchronization signals (in this example, frame start signals and macro-block start signals) as references for determining when the various predetermined time slots occur. The controller also outputs to the interface address data indicating where in the memory, MEM, data is stored relating to the macro-block or line of pixels to be processed by a given module during a particular time period. This address data will, generally, be defined in terms of a start address, and a number of consecutive address locations to access. In some cases, the address data applicable to a given request to be made by a module depends upon the result of some calculation made by another module (which may be another process of the same physical device). In such a case, the controller receives data regarding the result, from the module performing the calculation and generates address data accordingly.

If the interface INT reads/writes data at a different speed from that used by the module PROC, a buffer, BUF, dedicated to module PROC can be placed between the interface INT and the module PROC, to store the data read from memory, MEM, and intended for this module. In this case, the module PROC is arranged to read/write data from/to the buffer at the predetermined time intervals. In this case, during a read operation, if module PROC does not receive from the buffer an acknowledgement signal indicating that data for it is present in the buffer, operation of this module is stalled until such time a subsequent request is acknowledged.

In the time-slotted memory-access scheme of FIG. 1, the module PROC is designed to receive and/or output data during predetermined time periods of set duration, via requests made to the memory interface (or, in some cases, to a buffer) during said predetermined time periods.

Figure 2:
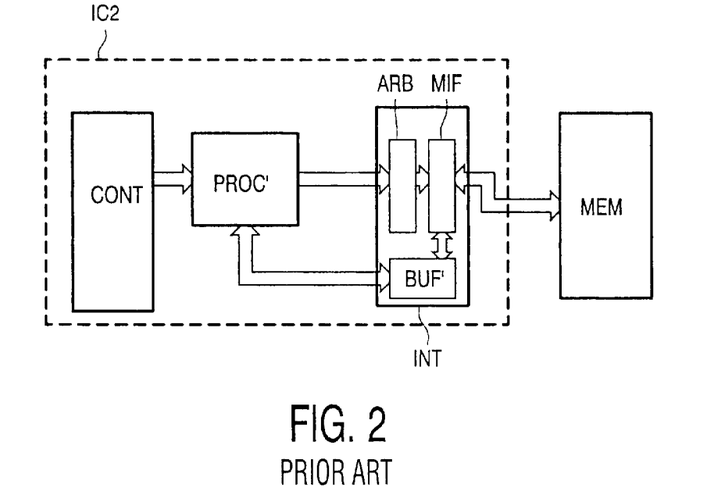
FIG. 2 is a diagram illustrating the basic components of a system in which requests by processing modules for access to a common memory are managed according to an arbitration scheme.

FIG. 2 illustrates a typical system including an arbiter arbitrating between different requests issued from a plurality of agents. Once again, in this example, the agents are processing modules PROC' sharing a common memory, MEM, and only a single agent on the chip, IC2, is illustrated in FIG. 2. In this case, the interface, INT, incorporates an arbiter, ARB, applying an arbitration scheme to determine which of a plurality of access-requests that are valid at a given instant will be successful. The arbitration scheme may be a round-robin scheme, or it may be based upon priorities (perhaps variable priorities) allocated to the different modules, or it may be any other known arbitration scheme. The successful access request is passed to a memory interface MIF which handles the physical access to the memory MEM and the routing of data between MEM and PROC'.

In this system, it is not known beforehand how much time will intervene between the making of a request by a given module and the granting of access by the arbiter in response to the request. Accordingly, for each module a buffer BUF' is provided between the module and the interface. This intermediate buffer may be implemented using a single memory (SRAM) having separate portions dedicated to different modules.

In the arbitrated memory-access scheme of FIG. 2, the modules issue access-requests at variable times and of variable duration, and may receive and/or output data at irregular intervals of variable duration.

In some circumstances it may be desirable to employ in a single system modules that have been designed for different resource-accessing schemes. For example, in the context of an MPEG codec, it can arise that encoder and decoder chips (integrated circuits) are designed separately, the decoder chip making use of an arbiter selecting between the access-requests made by the different processes in the decoder whereas the encoder uses a time-slotted access-management scheme to ensure that its component processes have the required access to main memory. Although separate memories could be used for the encoder and decoder chips, this obviously increases costs and complexity of the codec. It would be preferable to use a memory common to both chips and, thus, it is necessary to use a single scheme for managing access to this common memory.

In order to reduce costs, it is preferable to keep the architecture of the different integrated circuits unchanged as far as possible. A priori this counts against the use of a time-slotted memory-access scheme, because data is not readily available regarding the timing and duration of the access-requests made by the modules designed for a request-arbitration scheme.

A request-arbitration memory-access scheme has the advantage that it provides efficient bandwidth partition between the different modules requiring memory access. However, there is a problem with using a request-arbitration scheme for a module PROC designed for a time-slotted scheme because it may be difficult to guarantee that data for PROC will be available at the periodic intervals for which module PROC is programmed.

More particularly, during the intervals at which module PROC "expects" to read/write data from/to the common memory it requires a high bandwidth access. In some cases, the memory may simply not be designed for such a high bandwidth access (the bus properties are not appropriate). However, even in cases where high-bandwidth access is possible, another module may be accessing the memory already at an instant when a request from module PROC is issued, and this access may be uninterruptible. One solution to this problem would be to change the design of the arbitration scheme so as to give requests from PROC a high priority. However, this solution is not sufficient to remove the risk of data underflow to module PROC during read access.

BRIEF SUMMARY OF THE INVENTION

It is an object of the present invention to enable an agent designed for a time-slotted resource-access scheme to be used in a system employing an arbiter arbitrating between requests of different agents for access to a common (shared) resource.

It is a further object of the present invention to enable costs to be reduced in a system employing: an arbiter arbitrating between requests of different agents for access to a common resource, and at least one agent designed for a time-slotted resource-access scheme.

The invention takes the following aspects into consideration. An anticipatory request-generator is associated with the agent designed for a time-slotted resource-access scheme. Ahead of the time periods when the agent is programmed to receive data from the common resource, the anticipatory request-generator generates access-requests and submits these to the interface managing access to the common resource. The anticipated request will give rise to access to the common resource, according to the arbitration scheme implemented by the interface, before the time period arrives at which the agent requires the data. A buffer is placed between the interface and the agent, for temporarily storing the data received as a result of the anticipated request. During the time periods when the agent is programmed to fetch data it will do so from the buffer. Write-access requests made by the agent at the pre-programmed instants in time will simply be forwarded to the arbiter (optionally, via a buffer).

The agent adapted for a time-slotted resource-accessing scheme is integrated into a system based on request-arbitration by virtue of the presence of the anticipatory request-generator and buffer. In the case where this agent is one of a plurality of agents, all adapted for a time-slotted access scheme, provided on an integrated circuit, minimal changes are required to the IC architecture. It may merely be necessary to modify a pre-existing interface associated with the agents, if this interface was provided on-chip.

The anticipatory request-generator is preferably arranged to generate requests based upon control data and synchronization signals provided by a controller designed for configuring and/or controlling the time-slotted resource-access scheme. The control data includes at least data indicating the relationship between time slots and agents requiring access to the common resource. A single integrated circuit (IC) may comprise a core consisting of a set of modules provided with a core controller of this type.

In some cases, certain of the access-requirements of the agent(s) designed for a time-slotted access scheme may be unpredictable. In other words, the nature of the required access (typically, in terms of the address to be read) may become known only a very short time before the time slot at which the agent is programmed to request access. In such a case, it is advantageous to program the anticipatory request-generator to generate anticipated requests for substantially all of the predictable access-requests, and to adapt the arbitration scheme such that it prioritizes the unpredictable access-requests.

The present invention is of particular interest when applied to systems in which processing modules require access to a common memory. In this case, the controller associated with modules adapted for a time-slotted memory-access scheme will often be adapted to provide address data relative to the read/write operations of each module. The anticipatory request-generator can make use of address data received from the controller in order to generate the anticipated requests. In other cases, the processing modules themselves may generate the address data. In such cases, the anticipatory request-generator collects the necessary address data from the processing modules, when the address data is generated sufficiently early (predictable requests). In general, the core controller or processing modules generate data relating to logical, rather than physical, addresses of an external memory. An associated unit translating between logical and physical addresses is then associated with the core controller/modules.

In systems and methods according to the present invention, in order to ensure that the access-requirements of all agents are properly met, it is preferable to adopt an arbitration scheme in which access-requests of different agents have different priorities. Preferably, this is achieved by using a hierarchical arbitration scheme comprising a plurality of levels, in which time-constrained and periodical access-requests are assigned to a level high up in the hierarchy. Such a hierarchical scheme can be implemented using a cascaded set of state machines, the output from a state machine lower down in the hierarchy serving as an input to a state machine at the next highest level of the hierarchy. At each level in the hierarchy, access-requests compete and the winning request serves as the output from the state machine. The output from the state machine highest in the hierarchy corresponds to the access-request of the agent that has been successful in the arbitration. This access-request will thus be processed (or be placed in a queue of successful requests awaiting processing). This arbitration scheme can be modelled on the hierarchical arbitration scheme described in WO98/12645.

In embodiments of the present invention where the arbiter implements a hierarchical scheme using state machines, it is preferred that for the majority of states of the state machines, fixed priorities are assigned to the different access-requests. However, it is advantageous to ensure that a state machine corresponding to a high level in the hierarchy has free states in which there is no pre-assigned priority between the requests competing at that level.

BRIEF DESCRIPTION OF THE DRAWINGS

The invention and additional features, which may be optionally used to implement the invention to advantage, are apparent from and elucidated with reference to the drawings described hereinafter.

FIG. 3 is a diagram showing the timing of memory-access requests made by different processes in an MPEG encoder integrated circuit designed to handle memory access in a time-slotted manner, in which:

FIG. 6 is a state diagram illustrating the sequence of states traversed by the main state machine in the processes arbiter of FIG. 5, in which:

First some remarks will be made on the use of reference signs. Similar entities are denoted by an identical letter code throughout the drawings. Various similar entities may be shown in a single drawing. In that case, a numeral is added to the letter code so as to distinguish similar entities from each other. The numeral will be between parentheses if the number of similar entities is a running parameter. In the description and claims, any numeral in a reference sign may be omitted if appropriate.

DETAILED DESCRIPTION OF THE INVENTION

The present invention will be described below in the context of an MPEG codec made up of an encoder designed to employ a time-slotted memory-access scheme and a decoder designed to employ an arbiter arbitrating between memory-access requests. However it is to be understood that the invention can be applied in a wide variety of other contexts. The encoder corresponds to an integrated circuit of the general type illustrated in FIG. 1, and the decoder corresponds to an integrated circuit of the general type shown in FIG. 2. It is assumed that the encoder and decoder ICs were originally designed without the intention to use them in a common system. In integrating these ICs into a common system, some changes in configuration of the component ICs is required but the present invention enables changes to the IC architectures to be minimized.

Before describing the structure and operation of the codec, it is useful to make some comments regarding the characteristics of the individual encoder and decoder ICs as originally designed and configured.

In the present example, the decoder IC as originally designed comprises a number of processes adapted to make requests for access to an external SDRAM via a memory interface, the timing and duration of these requests not being known a priori. These processes include DISPLAY, OSD (On Screen Display), PIP (Picture in Picture), INTERP, MC (Motion Compensation), VFW (Video FIFO Write), VFR (Video FIFO Read), AFW (Audio FIFO Write), AFR (Audio FIFO Read), AWRBW (Audio Write Back Write) and AWRBR (Audio Write Back Read).

The process DISPLAY concerns the display of the decoded images. The process OSD concerns the display of graphical data superposed on a displayed decoded image. The process PIP concerns the display of a stationary image as a background or showing through a decoded and processed image. The process INTERP concerns the last part of MPEG decoding, providing decoded images to be loaded into the SDRAM in order to display them or use them as reference images, or both. The process MC concerns the motion compensation, which is a step in MPEG video decoding. The processes VFW, VFR and AFW, AFR concern the writing and reading of encoded audio and video data extracted from a stream of MPEG data by means of a descrambling/demultiplexing circuit. The processes AWRBW and AWRBR concern the writing and reading of intermediate results from an audio processor. These processes are discussed in the applicant's earlier European patent application no. 00203007. The details of these processes are given in various standards defined by the Motion Picture Experts Group but little further description will be included here since knowledge of all these details is not essential for an understanding of the present invention.

The memory interface of the decoder IC comprises a request wrapper for transmitting the decoder process requests to the MMI in a form compatible with the MMI. The memory interface also includes an SRAM serving as an intermediate buffer, BUF, for storing data pertaining to requests, en route between the main memory and the decoder processes via the MMI, until such time as the request in question succeeds in the arbitration. The SRAM is divided into several buffers (FIFOs) which receive data from the external SDRAM for each of the respective processes. A unit (not shown) is also provided in the decoder DMA interface to associate each request with the corresponding data so as to ensure the correct routing of the data to the appropriate FIFO in the intermediate buffer. This unit manages the pointers and data streams for the FIFOs of each process in the SRAM.

The encoder IC is designed to include a configurable memory access interface that works in a time-slotted way. A CPU serves as controller of the IC and downloads into the memory interface a table containing the distribution of memory bandwidth between the different processes in the encoder. These processes include: Current Macroblock being processed by the Macroblock Processor (MBPcurrent), Audio Elementary Stream In (AESin), Video Elementary Stream In (VESin), Audio Elementary Stream Out (AESout), Video Elementary Stream Out (VESout), Multiplexor Command In (Muxcom__in), Multiplexor Command Out (Muxcom__out), Macroblock Processor Candidates (MBPcand, specifically MBPcand1 to MBPcand5), Macroblock Processor Winner Color (MBPwincolor), Macroblock Processor Write-Back (MBP WR BK), and Video Front End (VFE). Once again, few details of these processes will be given here since knowledge of all these details is not essential for understanding of the present invention.

The downloaded table corresponds to the start times of the various requests made by the different processes in the encoder. An example of such a table is given below in Table 1. It is to be understood that the various processes listed in Table 1 do not necessarily involve the same macroblock (in other words, while MBP cand data concerns the macroblock currently being processed, here denoted MBk+1, MBP__Wincolor data concerns the macroblock four macroblocks earlier (i.e. MBk–3). Moreover, generally, the processes VES__in, VES__out, AES__in, AES__out, Mux__Com__in, MUX__Com__Out, and VFE do not handle data in terms of macroblocks but rather in terms of other units, such as lines of pixels.

TABLE 1

| Process | Read/Write | No. of requests | No. bursts/request | Request start cycle |
|---|---|---|---|---|
| MBP__current (MBk+1) | R | 1 | 6 | 0 |
| MBP__cand (MBk+1) | R | 5 | 13 | 15,33,51,69,87 |
| MBP__wincol (MBk–1) | R | 1 | 6 | 103 |
| VES__in | R | 3 | 1 | 120,132,136 |
| AES__in | R | 3 | 1 | 147,151,155 |
| Mux__com__in | R | 1 | 1 | 130 |
| VFE__out | W | 22 | 1 | 7,9,11,13,29,31,47,49,65, 67,83,85,101,110,122,124, 126,128,134,145,149,153 |
| AES__out | W | 1 | 1 | 112 |
| VES__out | W | 3 | 1 | 114,116,118 |

TABLE 1-continued

| Process | Read/Write | No. of requests | No. bursts/request | Request start cycle |
|---|---|---|---|---|
| MBP__WR__BK (MBk–3) | W | 1 | 6 | 138 |
| Mux__com__out | W | 1 | 1 | 157 |

Figures 3A, 3B:
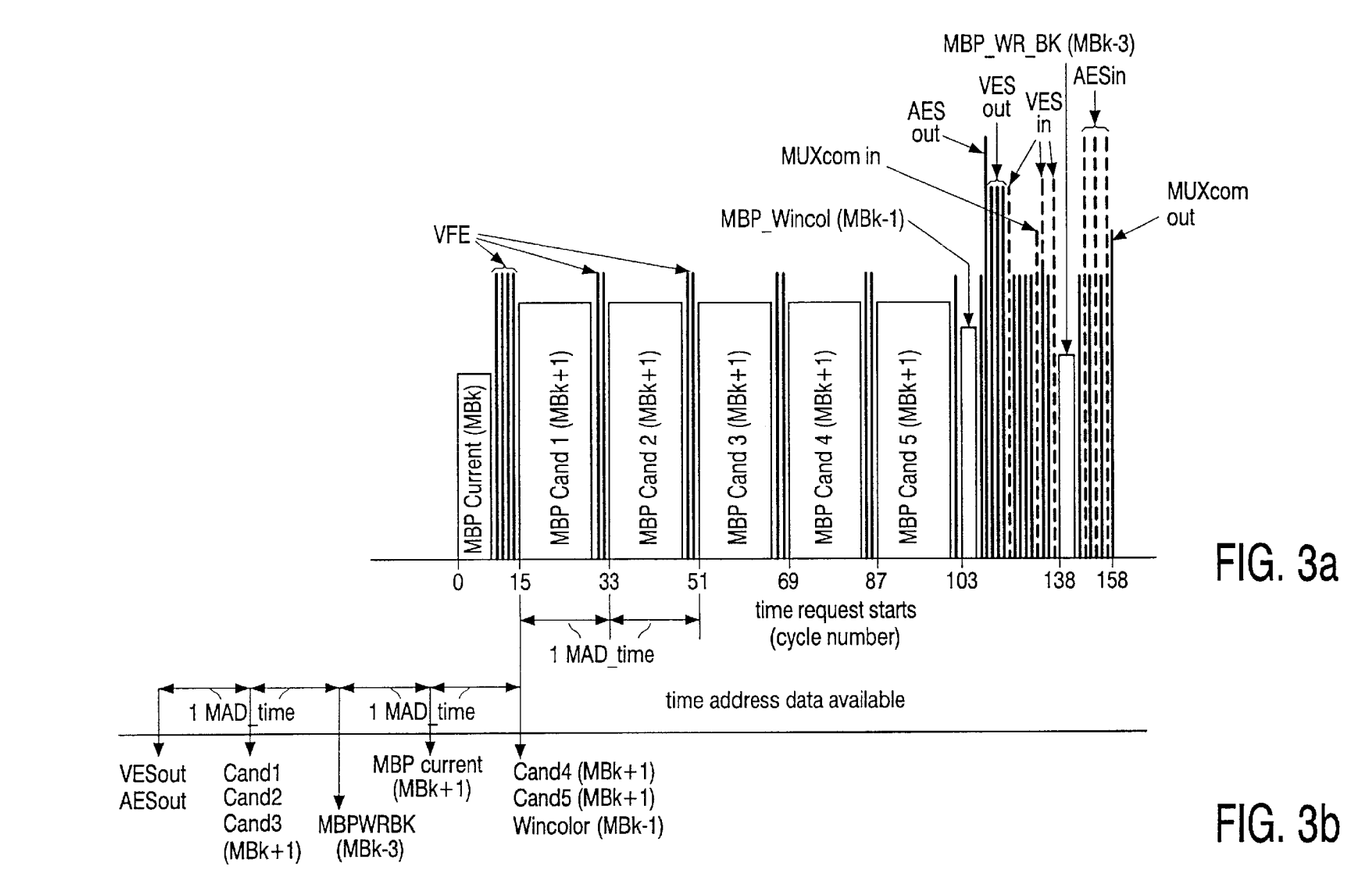
FIG. 3a) shows the cycle numbers at which the respective requests begin.
FIG. 3b) shows the times at which address data relating to each request first becomes available.

The start times of the processes in Table 1 are indicated graphically in FIG. 3a), with reference to the cycle number at which the respective request starts. In FIG. 3a), bars of different heights are used to help differentiate between requests generated from different processes. Also, in order to differentiate between input and output information of the same type, solid and dashed bars have been used in FIG. 3a).

The main encoder and decoder processes are listed in Table 2 below, together with an indication of the bandwidth used when the individual encoder and decoder ICs are operated stand-alone (that is, they are not associated in a codec).

TABLE 2

| Decoder processes | Bandwidth (Mbyte/second) | Encoder processes | Bandwidth (Mbyte/line) |
|---|---|---|---|
| DISPLAY | 21.85 | MBP current | 15.36 |
| OSD | 13 | AESin | 7.68 |
| PIP | 10.25 | VESin | 7.68 |
| INTERP | 15.5 | AESout | 2.56 |
| MC | 45 | VESout | 7.68 |
| VFW | 2.5 | Muxcom__in | 2.56 |
| VFR | 2 | Muxcom__out | 2.56 |
| AFW | 1.15 | MBP cand | 166.4 |
| AFR | 1.15 | MBPwincolor | 15.36 |
| AWRBW | 1.15 | MBP WR BK | 15.36 |
| AWRBR | 1.15 | VFE | 36 |
| TOTAL | 114.7 | TOTAL | 279.2 |

When the encoder and decoder ICs are integrated into a common system, where memory access is handled by request arbitration, the accesses of high priority encoder requests cannot be delayed—data for a given process must be guaranteed at a given instant. However it is still necessary to guarantee the necessary bandwidth for decoder processes.

Figure 4:
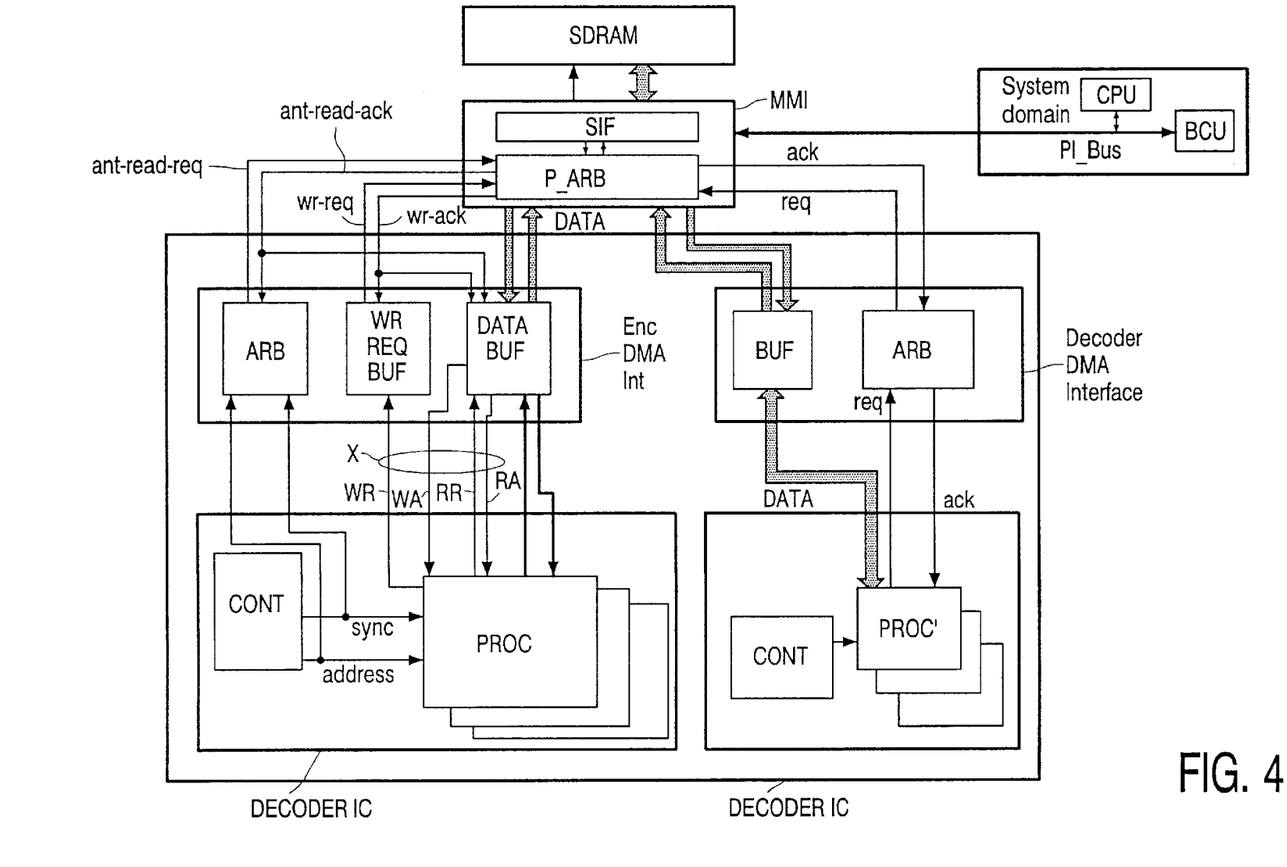
FIG. 4 is a block diagram illustrating the principal components of an MPEG codec integrating an encoder IC designed to handle memory-access in a time-slotted manner and a decoder IC designed to handle memory-access via request arbitration.

FIG. 4 illustrates the main components of a codec according to a preferred embodiment of the present invention, integrating the above-described encoder and decoder ICs. In addition to the encoder and decoder chips, the codec includes a memory of SDRAM type, a system CPU and Bus Control unit (BCU), with associated Peripheral Interface Bus (PI__bus), for controlling the overall system, and a Main Memory Interface (MMI) including an arbiter, P__ARB, for arbitrating between requests made for encoder and decoder processes, and requests made by the system CPU. The MMI interface also includes an SDRAM controller for handling the physical access to the SDRAM. The system CPU, BCU and associated bus constitute what is known as the "system domain". The encoder and decoder chips and MMI interface constitute what is known as the "signal domain".

The system CPU is used to drive the encoder and decoder and to run applications. The system CPU performs periodical accesses to the SDRAM whose frequency is based on the system clock frequency that depends upon the type of SDRAM being used. A memory-access request from the system domain CPU has small latency (that is, only a short delay is tolerable between the making of the request and satisfaction of the request). Thus, a system CPU request should have the highest priority and, more particularly, it should supercede all signal domain requests. In preferred embodiments of the present invention, the signal domain processes arbiter, P_ARB, is adapted to interrupt accesses to the SDRAM, made on behalf of processes in the signal domain, in favor of access requests from the system domain CPU. When the system CPU request has been acknowledged, then the signal domain process request can be continued from the point of interruption.

The Direct Memory Access (DMA) interfaces of the encoder and decoder chips are connected to the signal domain arbiter P_ARB. Data exchanges between the DMA interfaces and the signal domain interface (MMI) make use of bursts of 16 memory words (in this example, each memory word has 32 bits). By way of contrast, data exchanges between the various encoder read and write processes and the encoder DMA interface involve bursts of 8 memory words per request.

Access requests involve the exchange of request and acknowledgement signals between, for example, the encoder or decoder DMA interface and the signal domain arbiter P_ARB, and between the encoder or decoder DMA interface and the encoder/decoder process making the request. More particularly, the anticipatory request generator of the encoder DMA interface sends anticipated read requests (ant-read-req) to P_ARB and receives back anticipated read acknowledgements (ant-read-ack). A write request buffer in the encoder DMA interface transmits write requests (wr-req) to P_ARB and receives back write acknowledgements (wr-ack) therefrom. The decoder DMA interface sends requests (req) of both read and write type to P_ARB and receives back acknowledgements (ack). Any convenient request/acknowledge protocol can be used and different protocols may be used between different pairs of units in the signal domain.

The signal domain arbiter P_ARB is very flexible in terms of arbitration algorithms because it comprises a plurality of state machines which can be configured to have different priorities. As indicated above, the highest priority is assigned to a request from the system domain CPU. Each state machine is configured so as to implement a fixed priority selection scheme. The scheme is designed such that the respective state machine passes through states in a particular order, and the process whose request has highest priority in each state is set so as ensure that sufficient bandwidth is allocated to each process.

Inspection of FIG. 4 shows that the architecture of the decoder IC has not been changed as a result of the integration into the codec. However, the requests generated by decoder processes are now processed by an arbiter (P_ARB) located in the MMI, rather than by an arbiter present in an on-chip interface as in FIG. 2.

For the encoder IC, the core architecture (controller CPU and processors) remains substantially unchanged, but changes are required in the architecture of the DMA interface so as to enable this IC to be integrated into a system using a memory-access scheme based on request-arbitration. More particularly, the encoder DMA interface is provided with an anticipatory request generator, ARG, adapted to generate and forward read requests to the processes arbiter P_ARB ahead of the times when the associated data is required by the encoder modules, such that the required data can be read from the SDRAM and stored in an internal buffer, BUF, also provided in the encoder DMA interface.

In order to be able to generate anticipated requests, the anticipatory request generator must have available to it information regarding the times at which different encoder processes will generate their read requests and information regarding the addresses in the SDRAM where data is to be read. Before beginning macroblock processing operations, the encoder core controller downloads its configuration table mentioned above (example given in Table 1) to the ARG, which therefore is informed regarding the timing of the read requests by the various encoder core processes. This configuration table is programmable and includes data on the number of requests per process, the number of bursts of data to be read from the SDRAM per request, and the start cycle numbers for each request, as shown in Table 1.

However, the times at which the address data associated with the various read requests becomes available varies. Address data for certain encoder read requests may become available so late as to render these requests substantially incapable of prediction. However, the read requests generated by the various macroblock processor operations are capable of prediction.

FIG. 3b) illustrates the time available for predicting encoder read requests of different types relating to macroblock processing, for the example given in Table 1. It will be seen that the address data required for the read requests (fetches) relating to MBP candidates 4 and 5 of a macroblock $MBP_k$ only become available when a calculation relating to the preceding macroblock $MBP_{k-1}$ has been completed, this occurs 3 Mean Average Distance (3_MAD) times ahead of the instants when the MBP_cand4 and MBP_cand5 fetch requests are made (1 MAD time is equivalent to 18 cycles of the encoder system clock). For the fetches of MBP candidates 1, 2 and 3, the relevant intervals are 3, 4 and 5_MAD times respectively, and for the read requests associated with MBP_wincol, AES/VES_out and VFE_out, the relevant intervals are 5, 9, 9 and 9 MAD times, respectively. Incidentally, not all encoder process read requests are predictable.

In the present embodiment of the invention, the core controller generates a number of synchronization signals, including Framerdy, MBPstart and Memstart. The Framerdy signal is a synchronization pulse, transmitted both to the ARG and to modules within the encoder, to signal the beginning of processing of a frame of an image signal. The MBPstart signal is a synchronization pulse, transmitted both to the ARG and to the macroblock processing module within the encoder IC, to signal the beginning of the processing of a macroblock within the frame. The Memstart signal is a synchronization pulse, occurring 3_MAD times ahead of the MBPstart pulse, transmitted to the ARG so as to cause the ARG to generate anticipated requests. The ARG generates anticipated requests at the same relative timings as the corresponding read requests are made by the associated processes, but 3_MAD times ahead of the instants when the processes make their requests. The arbitration scheme implemented by the signal domain arbiter, P_ARB, is adapted to ensure that this advance is sufficient to guarantee that the data is read and placed in the internal buffer before it is required by the associated process.

In the present embodiment, the ARG generates anticipated access-requests based on a configuration table, downloaded from the encoder IC core controller, that is the same as the core controller would generate for an environment using time-slotted accesses. However, the present invention is not limited to this case. The look-up table transmitted to the ARG and used as the basis for generating anticipated access-requests can be different. For example, the interval between an anticipated access-request and the issuing of a corresponding request for the same process can be different for different processes, taking into account differences in the time periods at which address data becomes available for these different accesses. Moreover, since address data becomes available far in advance, the ARG can issue anticipated access-requests even at cycle zero of the look-up table.

The encoder core controller also supplies the ARG and the encoder module with logical address data for the various requests. This logical address data indicates the position of the macroblock (or block) within the image. This logical address data is converted to physical address data by a translation circuit internal to the ARG, which performs calculations to generate physical address data based on parameters stored in registers that are also internal to the ARG. The physical address data generated by the ARG indicates the start address, the access type, and the number of bursts of data in memory to be read (possibly expressed in terms of x and y coordinates if the addresses to be read are not consecutive in the SDRAM, for example in the case of processing a macroblock when the SDRAM is organized in terms of lines of pixels). The ARG can generate the required physical address data from the logical address and the process type. The process type is inherently known by virtue of the timing of the logical address signal received from the core controller. Information contained in the configuration table (for example Table 1) is used to deduce data regarding the number of bursts to read.

The above description assumes that both the encoder and decoder DMA interfaces generate a single request and a single associated address in order to access two bursts of data in the SDRAM (these two bursts corresponding, in general, to consecutive bursts of data). However, in practice, this may not be possible depending upon the memory mapping used to relate data in the SDRAM to the various encoder and decoder processes. For example, perhaps the memory mapping with regard to decoder data is such that the pair of bursts to be accessed via a single request are stored at the same row address but in two different banks of the SDRAM. In such a case, a single address per request is sufficient to cause these two bursts to be written/read in the SDRAM. However, perhaps the memory mapping with regard to the encoder data does not allow the use of the same row addresses for two consecutive bursts, stored in different banks.

The above problem can be solved in a number of ways:
the memory mapping of the encoder data in the SDRAM could be changed (however, this may be undesirable if the memory mapping has been optimized for the encoder processes),
an offset could be included in the address sent to the SDRAM interface. The primary address would then determine the position of data placed in the first bank whereas the offset would be added to the primary address so as to indicate the address of data placed in the second bank, or
an association could be made between two successive encoder requests and their respective addresses, in order to represent the pair of requests by a single request with two associated addresses. Such a solution would require adaptation of the arbitration scheme implemented by the main state machine in the processes arbiter, so as to replace each state assigned to an encoder process into two consecutive states, one per burst request.

For the encoder write processes, each write request generated by the process at the predetermined time slot is fed to a write requests buffer in the encoder DMA interface, the associated data is loaded into the data buffer BUF in the encoder DMA interface. No further action is required by the process originating this write request. The encoder DMA interface then forwards a write request to P_ARB. When the write process wins the arbitration implemented by P_ARB an acknowledgement signal (wr-ack) is sent to the encoder DMA interface and the data present in the data buffer will be transferred into SDRAM memory via the MMI interface.

As mentioned above, the anticipated requests generated by the ARG cause data to be read in the SDRAM and loaded into the intermediate buffer in the encoder DMA interface. Typically, the intermediate buffer is a SRAM organized as a number of FIFOs, one read FIFO and one write FIFO per process. At the time when the ARG sends an anticipated request (or the write request buffer sends a write request) to the processes arbiter, the FIFO corresponding to the relevant process and relevant access type is sent a signal to get ready for receiving data. When the time instant arrives at which an encoder process sends a read request to the intermediate buffer, according to the timing indicated in Table 1, it does so using an address appropriate to the memory interface that would have been used if the encoder had been implemented in a time-slotted system. This address is not appropriate for the intermediate buffer being used in the encoder DMA interface. Accordingly, this buffer includes an address decoder to convert between the addresses of the old encoder IC interface and the actual addresses used in the intermediate buffer for the process in question. The required address conversion is simple, given that the process concerned is known, from the request timing. The appropriate FIFO can then be emptied.

The FIFOS of the intermediate read/write data buffer in the encoder DMA interface are dimensioned so as to ensure that no data overflow occurs. The time instants when anticipated requests are generated, and the design of the arbitration scheme, ensure that no data underflow occurs.

The arbitration algorithm implemented by P_ARB will now be described with reference to FIGS. 5 and 6. It will be seen from FIG. 5 that the processes arbiter comprises a number of state machines arranged in a hierarchy. For each state machine, a sequence of states is defined and, for each state, a single request is set as having highest priority. Certain states of the main state machine can be considered to be "free states" because at the instant in time when the state machine is in the "free state", there will be no request of the type defined as having highest priority. In such a case, no winning request is indicated at the output from the state machine. The different requests compete within respective state machines and the winning request in a state machine lower in the hierarchy then competes with requests in the next-highest state machine in the hierarchy.

More particularly, the processes arbiter comprises a first priority state machine (designated the "main state machine" in FIG. 5), and a unit implementing a fixed priority selection between the winning request from the main state machine and various other requests. It will be seen from FIG. 5 that the request winning the arbitration in the processes arbiter is not guaranteed to succeed; it must next compete, in an arbitration scheme implemented within the SDRAM interface, with requests coming from the system CPU. The arbitration scheme implemented in the SDRAM interface assigns highest priority to system CPU requests.

Early simulations enabled certain rules to be developed with regard to the state machines comprising the signal domain processes arbiter, P_ARB. In particular, it was determined to be advantageous to remove from the first priority state machine all the non-periodical and non time-constrained processes (such as VES_out, AES_out, for example). This led to better sharing of bandwidth for periodic processes and a greater number of free states in the first priority state machine. These free states are then available for use by winning requests competing in the lower priority state machines. It was also decided to remove from the first priority state machine one process (MBP_Wincolor) that is time-constrained. The simulation showed that the time sharing by this request type was not sufficiently efficient when MBP_Wincolor competed in the first priority state machine. Results were better when this request type was used as an input to the second priority state machine and made use of free states in the first priority state machine.

Thus, the main state machine handles the highest priority and periodical encoder and decoder processes, and the majority of processes whose time behavior must be controlled. In the present example, the request types handled by the main state machine are the encoder requests involved in macroblock processing (namely MBP_current, MBP_Cand1-5, MBP_WR_BK), encoder Video front end processes, and the following periodic processes in the decoder: DISPLAY, OSD, PIP, VFW, VFR, AFW0, AFW1, AFR and AWRBW.

Figure 5:
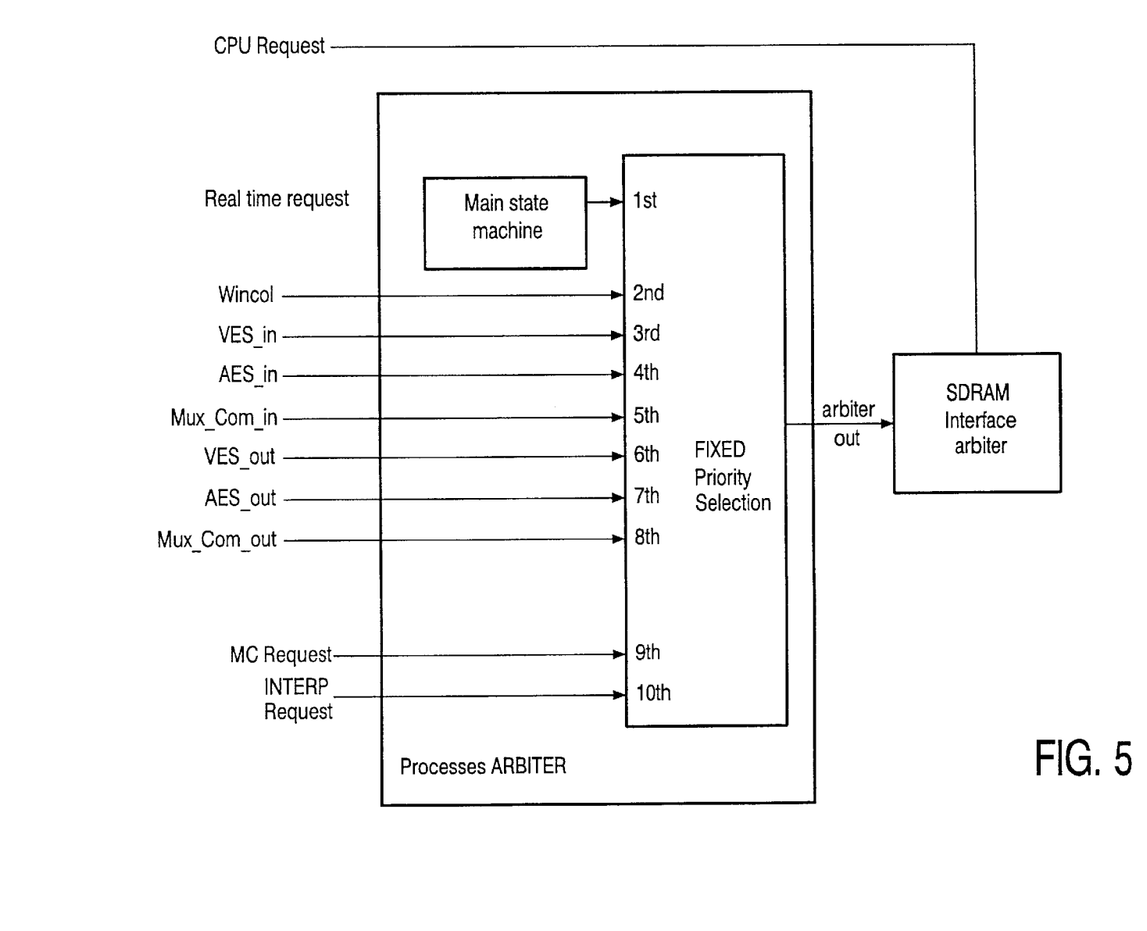
FIG. 5 is a block diagram illustrating the general structure of the processes arbiter included in the codec of FIG. 4.
Figure 6A:
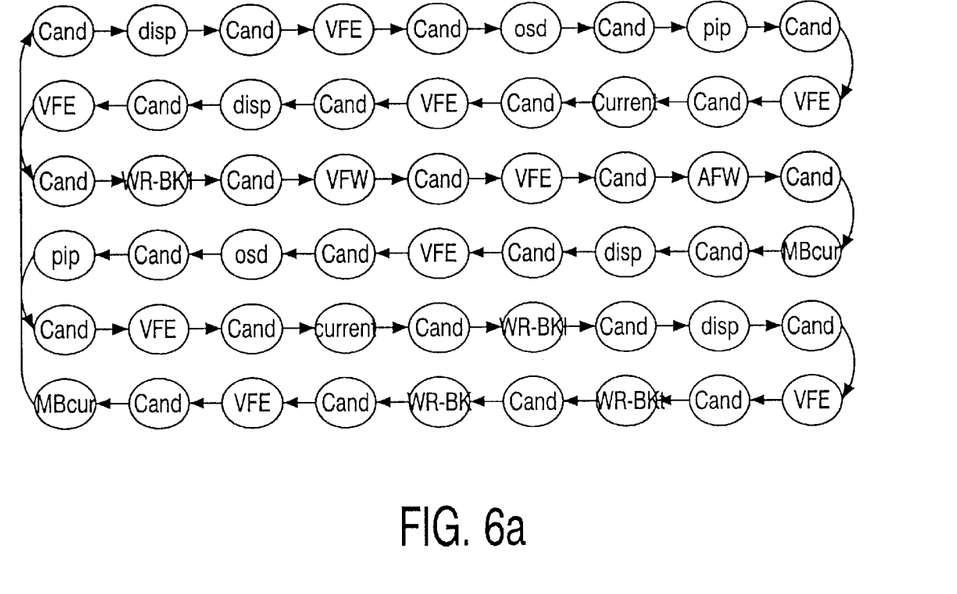
FIG. 6a) shows the sequence of states cyclically traversed by the main state machine, and FIG. 6b) shows the sequence of states traversed by two state machines associated with groups of processes indicated by starred states in FIG. 6a).
Figure 6B:
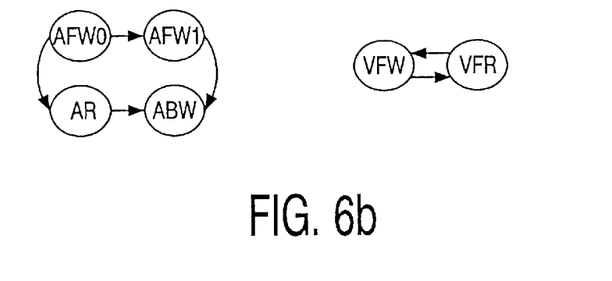

FIG. 6a) shows the sequence of 54 states repeatedly traversed by the main state machine of FIG. 5. The time taken for the main state machine to pass through the full set of states is about 3 MAD times depending upon the memory frequency (133 MHz in this example). At 108 MHz, to process a macroblock about three rounds (cycles) of the main state machine must be performed and about nine cycles are necessary to process an image line of pixels. The starred states in FIG. 6a) correspond to states in which one of a set of requests cyclically has highest priority according to a sequence defined by associated state machines illustrated in FIG. 6b). In other words, the main state machine of FIG. 5 is implemented using three interlinked state machines.

When designing the sequence of states to be implemented by the main state machine of FIG. 5, the following considerations were borne in mind:
- the state machine must be cyclic for the periodic (decoder) processes,
- the encoder data must be available to the encoder processes at particular instants in time, and
- the bandwidth required by the various encoder and decoder processes must be guaranteed.

More particularly, when deciding how many states to assign to a given process, the following computation was performed (with reference to Table 3 below):
1. For the main processes, the ratio of the bandwidth required by the process to the total required by all processes was computed (see column 4 of Table 3), this shows that 81% of the time slots should be assigned to encoder processes whereas only 18% of time slots should be assigned to decoder processes;
2. The encoder fetch of MBP candidates takes approximately half of the time slots, so half of the states (here 27) are assigned to candidate fetches;
3. Theoretical numbers of states to assign to other processes are computed from the bandwidth ratios, given the conversion rate 53.39%←→27 states (see $5^{th}$ column of Table 3); and
4. The number of main state machine states actually assigned to each process is obtained by rounding so as to ensure that the number of time slots per macroblock required by encoder processes, and the bandwidth for decoder processes, is achieved (see final column of Table 3).

TABLE 3

| Process | Time slots | Slots/line of macroblock | Process slots/total, % | Number of states (theory) | Assigned no. of states |
|---|---|---|---|---|---|
| DISPLAY | 24 | 384 | 7.01 | 3.54 | 4 |
| OSD | 14 | 224 | 4.09 | 2.07 | 2 |
| PIP | 12 | 192 | 3.50 | 1.77 | 2 |
| VFW | 3 | 48 | 0.88 | 0.44 | 1 |
| VFR | 3 | 48 | 0.88 | 0.44 | |
| AFW | 2 | 32 | 0.58 | 0.30 | 1 |
| AFR | 2 | 32 | 0.58 | 0.30 | |
| AWRBW | 2 | 32 | 0.58 | 0.30 | |
| AWRBR | 2 | 32 | 0.58 | 0.30 | |
| Total for decoder | 64 (for line) | 1024 | 18.69 | 9.45 | 10.00 |
| MBPcurrent | 6 | 270 | 4.93 | 2.49 | 4 |
| MBPCand | 65 | 2925 | 53.39 | 27.00 | 27 |
| MBP WR BK | 6 | 270 | 4.93 | 2.49 | 3 |
| VFE | 22 | 990 | 18.07 | 9.14 | 10 |
| Total for encoder | 99 (for MB) | 4455 | 81.31 | 41.12 | 44.00 |
| Total for codec | 163 | 5479 | 100.00 | 50.58 | 54.00 |

The choice of which request to assign highest priority in a given state affects the achievement of the bandwidth requirements of the various decoder processes. For example, for DISPLAY processes or decoder video front end processing, these request types are assigned highest priority in states that are regularly distributed through the main machine cycle. This allows periodic accesses and enables buffer sizes to be reduced. the data required by the various encoder processes is guaranteed by virtue of the numbers of main machine states assigned to these processes. For example, because half of the main machine states are assigned to MBP candidate fetches, at any time the request is performed, the required candidate data is guaranteed at the end of a main state machine cycle.

The early simulations also showed that for processes requiring lower bandwidth it was preferable to use single-state machines, that is state machines in which requests from a single process type are considered, and automatically "win" if they are raised at a given instant. The "winning" processes of these single-state machines are assigned to a hierarchy according to time constraints. This made more efficient use of free states on the first priority state machine. For example, as illustrated in FIG. 5, such single-state machines are used to handle MBP_Wincolor, VES_in, AES_in, VES_out, AES_out, MUXcom_out and MUXcom_in requests from the encoder and MC and INTERP requests from the decoder. Incidentally, MC and INTERP processes are assigned different priorities because they are not on the same pipeline stage. Moreover, VES_out, AES_out and MUXcom_out, are assigned to a lower priority than VES_in, AES_in and MUXcom_in since the latter three processes correspond to read data that is required by the Multiplexing function in the encoder at particular time instants.

In order to evaluate the feasibility of the approach adopted in the present invention, a simulation was performed using the codec architecture illustrated in FIG. 4 and an SDRAM working at 133 MHz transferring data in bursts of 32-bit words. It was also assumed that the system CPU made 1 access of the SDRAM every 50 cycles thereof (133 MHz). Each system CPU access involved a burst of 4 memory words. This provided a CPU bandwidth of 42.56 Mbytes/s.

(Incidentally, this represents the limit of CPU bandwidth supported in this example. A test involving one CPU access every 40 cycles showed that the amount of data to be accommodated in the video frontend buffer would increase up to 6 32-bit words per 100 cycles—which is considered to be excessive).

A statistical module was connected so as to monitor the signals ringed at X in FIG. 4. The statistical module monitored the time lapse (latency) intervening between the emission of a read or write request and the time when the corresponding acknowledgement signal was received. It also estimated the size of the data buffers required in the encoder DMA interface (in terms of memory words). This estimation took into account:

for the read processes: incoming bursts from the SDRAM interface into the encoder DMA interface and outgoing bursts between the encoder DMA interface and the relevant encoder read process, and for the write processes: incoming bursts from the relevant encoder write process to the encoder DMA interface and outgoing bursts from the encoder DMA interface into the SDRAM interface.

For each process two files were generated:
1. the first file contained the maximum measured latency per macroblock between the anticipated request and its acknowledgement, and the maximum size of the buffer computed per macroblock, and
2. the second file contained the maximum size of the buffer for each macroblock and the size of the buffer at the end of each macroblock processing.

By plotting the contents of these two files, a graphic indication could be given regarding the filling and emptying speed of each buffer. Table 4 below gives the results of this simulation in terms of the maximum sizes required for the encoder DMA buffers and the number of double burst requests made by the various processes.

TABLE 4

| Encoder process | Max. buffer size (in 32-bit memory words) | No. of double burst requests per macroblock period |
|---|---|---|
| MBP_current | 104 | 6 |
| AES_in | 96 | 3 |
| VES_in | 96 | 3 |
| AES_out | 16 | 1 |
| VES_out | 48 | 3 |
| MUXcom_in | 32 | 1 |
| MUXcom_out | 16 | 1 |
| MBP_Cand | 392 | 65 |
| MBP_Wincolor | 96 | 6 |
| MBP_WR_BK | 96 | 6 |
| VFE | 64 | 20–24 |
| Total | 1056 | 95–99 |

The data buffers in the decoder can have a small capacity (one or two bursts width) because the decoder is not based on a time-slotted behavior, simply requesting data as and when required.

The simulation showed that the encoder and decoder processes required bandwidth as shown in Table 5 below. The above-described arbitration algorithm according to preferred embodiments of the present invention guaranteed this bandwidth to the respective processes.

TABLE 5

| Encoder process | Bandwidth (average in Mbyte/s) | Decoder process | Bandwidth (average in Mbyte/s) |
|---|---|---|---|
| MBP_current | 15.55 | DISPLAY | 19.07 |
| AES_in | 7.78 | OSD | 9.71 |
| VES_in | 7.78 | PIP | (taken into account with DISPLAY) |
| AES_out | 2.60 | INTERP | 8.19 |
| VES_out | 7.78 | MC | 28.93 |
| MUXcom_in | 2.60 | VFW | 1.98 |
| MUXcom_out | 2.60 | VFR | 2.18 |
| MBP_Cand | 166.4 | AFW0 | 0.92 |
| MBP_Wincolor | 15.55 | AFW1 | 0.92 |
| MBP_WR_BK | 15.55 | AWRBW | 2.46 |
| VFE | 57.02 | AR | 4.87 |
| Total | 251.45 | Total | 79.23 |

The description above ignores the memory-access requirements of certain additional processes, such as Digital Video (DV, used in camcorders), Versatile Streams management (VSM) peripherals, second CPU, etc., that may be implemented in the decoder. However, the simulation results show that the techniques of the present invention enable modules adapted for time-slotted memory-access to be integrated into a system involving request arbitration. If the global bandwidth requirements of the overall system are substantial (as in the case where such additional decoder processes are included) then the present invention can still guarantee these bandwidth requirements by adapting the encoder core to implement interruptible bursts (which enables reductions to be made in the bandwidth requirements of the encoder processes). This adaptation requires changes in the physical addressing parameters (address of first word, number of words to fetch, etc.) associated with the various encoder requests.

The drawings and their description hereinbefore illustrate rather than limit the invention. It will be evident that there are numerous alternatives that fall within the scope of the appended claims. Notably, although the present invention has been described in terms of a codec comprising encoder and decoder ICs designed for different memory-access schemes, the invention is applicable in general to systems integrating modules designed for time-slotted and request-arbitration schemes for accessing a common resource.

Any reference sign in a claim should not be construed as limiting the claim.

What is claimed is:

1. Data processing device comprising a plurality of data processing agents, and adapted to co-operate with shared resource accessible by one agent at a time, the device comprising:

an interface adapted to manage access to said shared resource, the interface comprising arbitration means adapted to arbitrate between requests, issued by said plurality of data processing agents, for access to said shared resource, whereby to select which request will be successful;

characterized in that:
at least one of the data processing agents is adapted for making accesses at predetermined times for respective periods of known duration;
a controller is associated with said at least one of the data processing agents, the controller being adapted to generate control data indicative of the predetermined times at which the, or each respective, at least one data processing agent outputs requests for access to the shared resource;

a respective buffer is associated with the, or each of said, at least one data processing agent;

there is provided an anticipatory request-generator arranged to receive control data from said controller and adapted to generate and supply to said interface, at instants earlier than said predetermined times, anticipated access-requests on behalf of said at least one data processing agent;

the interface is adapted to cause data, obtained from said shared resource as a result of an anticipated access-request generated by the anticipatory request-generator on behalf of one of said at least one data processing agents, to be written into the respective buffer associated with said one data processing agent; and the, or each respective, at least one data processing agent is arranged to access the respective buffer associated therewith at said predetermined times.

2. The data processing device of claim 1, wherein the anticipatory request-generator is adapted to generate anticipated access-requests based on address data output by the controller.

3. The data processing device of claim 1, wherein the arbitration means implements an arbitration scheme wherein different access-requests have different priorities, and time-constrained or periodic access-requests are assigned a high priority.

4. The data processing device of claim 3, wherein the nature of the access required by certain of said at least one data processing agent is unpredictable, the anticipatory request-generator is adapted to generate said anticipated access-requests substantially for all of said at least one data processing agent with the exception of said certain data processing agents, and the arbitration scheme implemented by the arbitration means accords the high priority to access-requests from said certain data processing agents.

5. The data processing device of claim 3, wherein the arbitration means comprises one or more state machines having a plurality of states in which fixed priorities are assigned to different access-requests, and at least one of the state machines comprises free states in which there is no predetermination of which access-request has highest priority.

6. The data processing device according to claim 1, wherein said shared resource is a memory.

7. The data processing device according to claim 1, implemented as an integrated circuit.

8. A data processing system comprising the data processing device of claim 1 and said shared resource.

9. The data processing system according to claim 8, wherein said shared resource is a memory and said data processing system constitute an MPEG coder-decoder.

10. A method of managing access to a shared resource by a plurality of data processing agents, the shared resource being accessible by one data processing agent at a time, an interface being provided managing access to said shared resource, the interface comprising arbitration means adapted to arbitrate between requests, issued by said plurality of data processing agents, for access to said shared resource, whereby to select which request will be successful, and at least one of the data processing agents being adapted for making accesses at predetermined times for respective periods of known duration, the method comprising the steps of:

providing a controller associated with said at least one of the data processing agents, the controller being adapted to generate control data indicative of the predetermined times at which the, or each respective, at least one data processing agent outputs requests for access to the shared resource;

providing a respective buffer associated with the, or each of said, at least one data processing agents;

providing an anticipatory request-generator arranged to receive control data from said controller and adapted to generate and supply to said interface, at instants earlier than said predetermined times, anticipated access-requests on behalf of said at least one data processing agent;

adapting the interface to cause data, obtained from said shared resource as a result of an anticipated access-request generated by the anticipatory request-generator on behalf of one of said at least one data processing agents, to be written into the respective buffer associated with said one data processing agent; and arranging for the, or each respective, at least one data processing agent to access the respective buffer associated therewith at said predetermined times.

* * * * *